Figure 1:
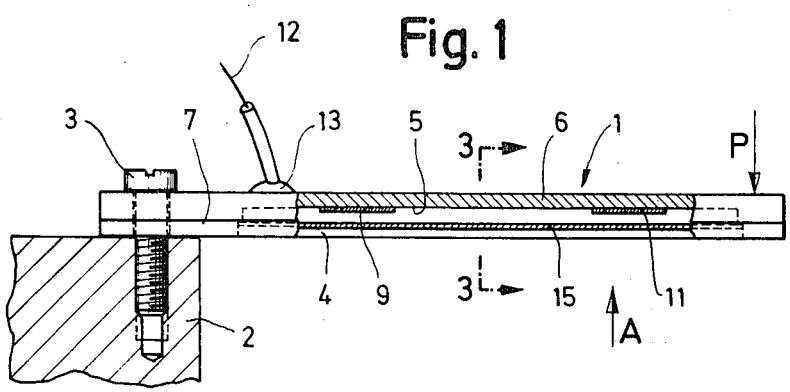

United States Patent [19]

Jetter

[11] 4,423,640

[45] Jan. 3, 1984

[54] ELECTROMECHANICAL BENDING FORCE RECEIVER, IN PARTICULAR FOR WEIGHING CELLS

[75] Inventor: Hans Jetter, Balingen, Fed. Rep. of Germany

[73] Assignee: Bizerba-Werke, Wilhelm Kraut GmbH & Co. KG, Balingen, Fed. Rep. of Germany

[21] Appl. No.: 316,330

[22] Filed: Oct. 29, 1981

[30] Foreign Application Priority Data

Nov. 15, 1980 [DE] Fed. Rep. of Germany ....... 3043139

[51] Int. Cl.³ .............................................. G01L 1/22
[52] U.S. Cl. .................................... 73/862.65; 338/5
[58] Field of Search .................... 73/862.65; 338/2, 5; 177/211

[56] References Cited

U.S. PATENT DOCUMENTS

| | | | |
|---|---|---|---|
| 3,411,361 | 11/1968 | McLellan | 73/862.65 X |
| 3,512,595 | 5/1970 | Laimins | 73/862.65 X |
| 3,706,349 | 12/1972 | Paelian et al. | 73/862.65 X |

*Primary Examiner*—Charles A. Ruehl
*Attorney, Agent, or Firm*—Shenier & O'Connor

[57] ABSTRACT

An electromechanical bending force receiver for weighing cells and the like in which at least one strain gauge is disposed in a notch-like recess in a bar-shaped bending body with a step surrounding the recess to form a plane surface located in the zone of the body which is neutral to bending and with a covering foil located in said zone hermetically bonded to said surface.

9 Claims, 10 Drawing Figures

ELECTROMECHANICAL BENDING FORCE RECEIVER, IN PARTICULAR FOR WEIGHING CELLS

The invention relates to an electromechanical bending force receiver, in particular for weighing cells, having at least one electromechanical transducer element in the form of a strain gauge disposed on a bending body, which is preferably bar-shaped and capable of being loaded with the force to be measured, and protected by an hermetic covering.

In the case of known bending force receivers of this type the covering is a bellows or diaphragm (U.S. Pat. No. 3,554,026). Bellows have to be of a large diameter due to the fact that they completely enclose the bending body and therefore influence the moment of inertia and thereby the strain to be measured. Sealing means in the form of a diaphragm, which may for example be applied directly onto the strain gauges or in their vicinity, have undesired, non-linear influences on the results of measurement. Coverings in the form of a bellows or diaphragm also behave differently at varying temperatures due to varying temperature coefficients of expansion with respect to the bending body. This may also lead to an undesired distortion of the results of measurement. Such influences have a negative effect on accuracy in particular for bar-shaped bending force receivers, which are intended for relatively small loads, when the load range is below 20 kilograms. Finally, the known coverings mentioned are relatively elaborate and expensive to produce.

The object of the invention is to design an electromechanical bending force receiver and to seal it hermetically with a cover such that the cover does not influence the results of measurement.

This object is solved according to the invention in that the strain gauge(s) are disposed in a notch-like recess in the bending body and the cross section of the bending body, at least in the area of the strain gauges, is designed such that the strain gauges are hermetically covered by a foil arranged in or near the neutral bending zone of the bending body.

Figure 2:
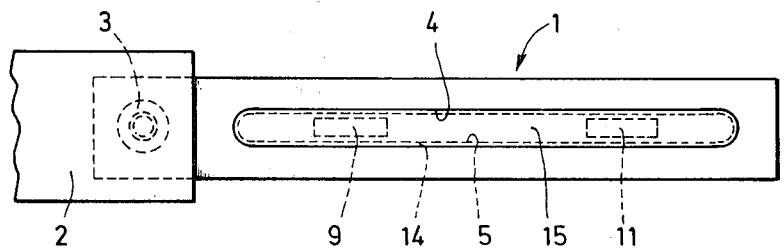
Figure 3:
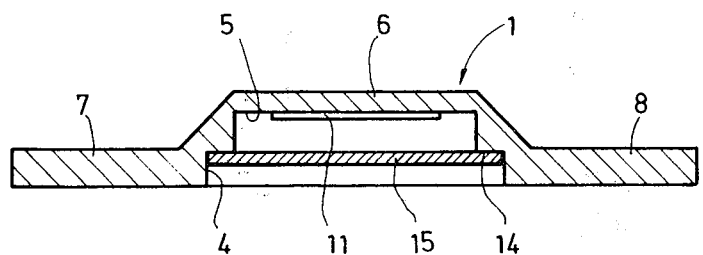
Figure 4:
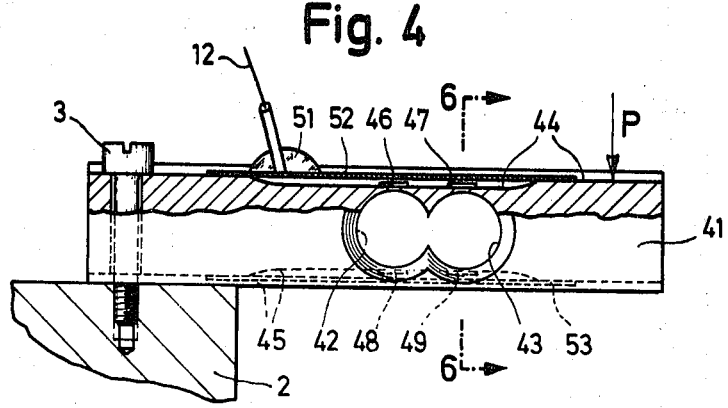
Figure 5:
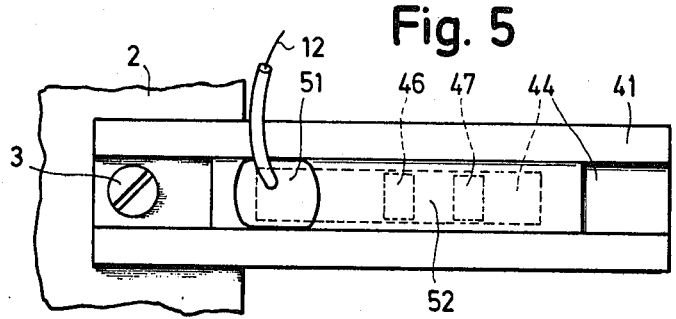
Figure 6:
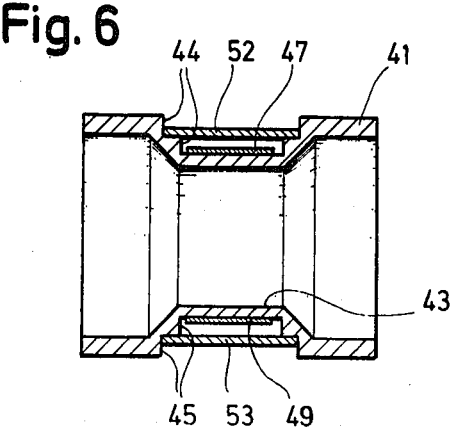
Figure 7:
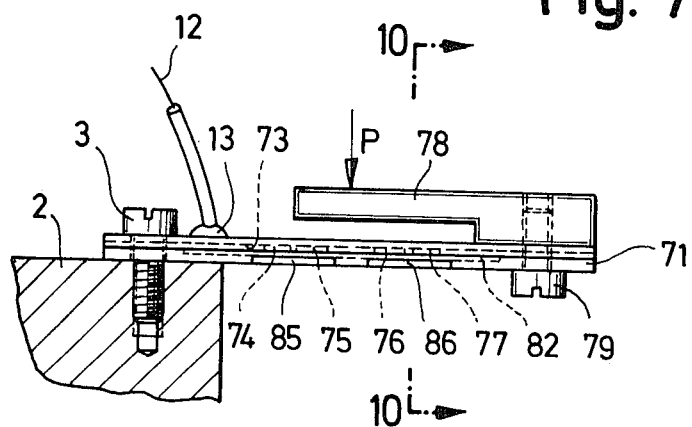
Figure 8:
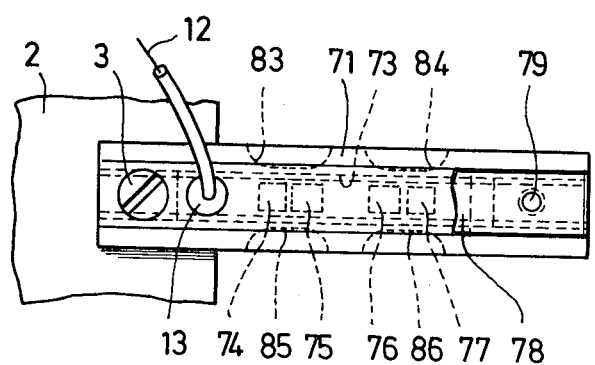
Figure 9:
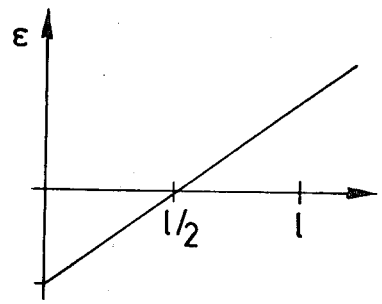
Figure 10:
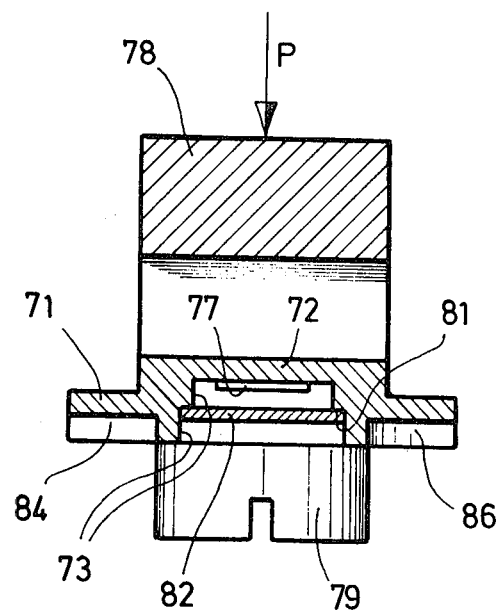

The following specification of preferred embodiments, in conjunction with the attached drawings, serves to explain the invention further. The drawings show:

FIG. 1 semi-diagrammatic—a partially cut away side view of a bending bar;

FIG. 2 a bottom view of the bending bar from FIG. 1 in the direction of arrow A;

FIG. 3 an enlarged transverse section along line 3—3 in FIG. 1;

FIG. 4 a partially cut away side view of a parallelogram bending beam;

FIG. 5 a topview of the bending beam from FIG. 4;

FIG. 6 a sectional view along line 6—6 in FIG. 4;

FIG. 7 a bending force receiver with a force applying arm projecting in the opposite direction to the bending body;

FIG. 8 a topview of the bending force receiver from FIG. 7 without a force applying arm;

FIG. 9 a diagram of the stretch with respect to the length of the bending force receiver from FIGS. 7 and 8 and FIG. 10 an enlarged sectional view along the line 10—10 in FIG. 7.

The electromechanical bending force receiver illustrated in FIGS. 1 to 3 comprises a bar-shaped bending body 1, which is secured with one end to a stationary base 2 by means of a screw 3 and capable of being loaded on its free end with a force P to be measured. The bending body 1 has a special cross-sectional form which can best be seen in FIG. 3. As shown, a stepped, notch-like recess 4 extends along the center line of the bending body 1 and over a considerable part of its longitudinal elongation. The floor 5 of this recess is located in a portion 6 of the bending body, which is raised above the remainder of this body. Two legs 7, 8 run laterally to portion 6 in the longitudinal direction of the bending body 1. The groove 4, which, in the illustrated embodiment, merely extends over the central portion of the bending body 1, could also be designed to extend over the entire length of the bending body. In this case the groove has to be sealed in the known way at both end faces of the bending body with special sealing compound.

Two strain gauges 9, 11 are secured to the floor 5 of the notch-like recess 4 opening, in the illustrated embodiment, downwards. The strain gauges 9, 11 are wired to each other in the known way whereby a measuring line 12, which is connected to the strain gauges and only schematically indicated in FIG. 1, is led through a sealing medium 13 and out of the bending body 1 in the known way. The measuring line 12 is connected in the customary way with analyzing equipment.

When the force P to be measured is applied to the bending body 1 this bends and the strain gauges 9, 11 experience a corresponding mechanical strain which is measured in the customary way and represents a measurement for the force P.

As shown in particular in FIG. 3 the notch-like recess 4 has a shoulder or step 14 running all the way round. The plane defining this step 14, which faces downwards in FIGS. 1 and 3, is located in the neutral bending zone of the body 1, i.e. it experiences practically no tension or strain when the body 1 bends. A cover foil 15 is secured to the step 14 disposed in the area of this neutral zone by means of bonding, soldering, welding or the like. This foil hermetically seals the area of the recess 4 lying below it and containing the strain gauges 9, 11 and therefore protects these strain gauges from environmental influences. As the foil 15 is therefore also located in the area of the neutral bending zone it cannot in practice influence the behaviour with respect to bending of the measuring body 1 and the strain gauges 9, 11 secured to it.

The cover foil 15 is produced from the same material as the bending body 1, in particular of metal, to achieve the same behaviour with respect to temperature. If desired the space, which is hermetically sealed by the foil 15 and contains the strain gauges 9, 11, can also be filled with an inert protective gas. It is also possible for adjusting elements, e.g. in the form of electrical resistors, also to be disposed in the space, which is hermetically sealed by the foil 15 and contains the strain gauges. These elements are also protected by the foil 15 against environmental influences. Such an arrangement of adjusting elements in the space covered by the foil 15 is particularly advantageous for the embodiments described in the following, with which the strain gauges are parts of a bridge circuit and the adjusting elements serve to balance the zero point of the bridge. In order to rule out interference with the bending strain as completely as possible the cover foil 15 should be as thin as possible and have a coefficient of elasticity which is as small as possible.

FIGS. 4 to 6 show a so-called parallelogram bending beam produced by using two bending bodies according to FIGS. 1 to 3. The two individual bending bodies result from material being removed from a solid bar-shaped body 41, which also preferably consists of metal, by inserting two full-length bores or recesses 42, 43. The longitudinal, cross-sectional form of these bores or recesses is shown in FIG. 6. As this figure also shows best groove-like recesses 44, 45 corresponding to the recess 4 in FIGS. 1 to 3 are inserted into the upper and lower sides of the body 41 by milling out the longitudinal sides. The cross-sectional form of the body 41 shown in FIG. 6 essentially corresponds, in the area of the bores or recesses 42, 43, to the cross-sectional form of the bending body 1 illustrated in FIG. 3 whereby two "bending bodies" are present in the bending beam according to FIGS. 4 to 6, these being connected with each other by the solid parts of the body 41. The areas best shown in FIG. 4, in which the wall between the grooves 44, 45 and the bores or recesses 42, 43 is the thinnest, form articulated links or pivots and enable a parallelogram-type movement of the parts of the body 41 connecting these areas. Strain gauges 46, 47 or 48, 49 are disposed on these thin areas, these strain gauges being mechanically stressed when a load is applied to the body 41 by a measuring force P and supplying an analyzable, electrical measuring signal. The strain gauges 46, 47, 48, 49 are again wired to each other in the customary way (not illustrated) and connected to form a bridge circuit. The measuring line 12 is led out via a sealing means designed e.g. as a glass duct 51.

Due to the bores 42, 43 and the insertion of the stepped, notch-like recesses 44, 45 in the upper and lower side of the body 41 a cover foil 52 or 53 can be secured to each of these sides in the neutral bending zone—corresponding to the embodiment according to FIGS. 1 to 3. These cover foils hermetically seal the strain gauges 46, 47, 48, 49 against environmental influences, in particular humidity.

The cover foils 52, 53 are located only in the sectional planes along line 6—6 in the neutral bending zone but since the strain gauges 46, 47, 48, 49, which serve as transducer elements, may be designed relatively small and since, on the other hand, the strain outside the above-mentioned, thin-walled areas serving as articulated links or pivots is considerably reduced no influences arise which could interfere with the measurement. With a further embodiment of a bending force receiver according to FIGS. 7 to 10 a bending body 71 is provided, the cross-sectional form of which corresponds essentially to that of the bending body 1 illustrated in FIGS. 1 to 3. Four strain gauges 74, 75, 76 and 77 connected with the measuring line 12 are secured to the bottom wall 72 of a groove 73 opening downwards. In order to create areas with positive and negative strain (tension or pressure) on the bending body 71 of the embodiment according to FIGS. 7 to 10 for the purpose of creating a simple bridge circuit out of four strain gauges the force P to be measured is not introduced directly to this body but to a force applying arm 78 ("rebound arm") projecting in the opposite direction to the bending body; this arm is self-supportingly secured to the free end of the bending body 71 by means of a screw 79. The course of strain ε is illustrated over the effective length l of the bending body 71 in FIG. 9.

In the left-hand area in FIGS. 7 to 9 a stressing takes place (negative strain ε) and a (positive) strain ε takes place in the area between 1/2 to the base of the arm 78. Such bending force receivers having positive and negative strain areas are known per se, for example from U.S. Pat. No. 3,341,796.

In order to seal the strain gauges 74, 75, 76, 77, which are disposed on the bottom of the groove 73, hermetically against environmental influences a thin cover foil 82 is—corresponding to the embodiments already described—disposed, e.g. pasted, on a step 81 of the groove 73 located in the neutral bending zone. The foil 82 is therefore also located in the neutral zone of the bending body 71 and cannot influence its behaviour with respect to bending. The cover foil extends over the whole, effective length l of the bending body 71. If, as shown in FIGS. 7 to 10, the groove 73 is designed to run the full length of the end faces of the bending body 71, i.e. open, a special sealing of these ends must be undertaken between groove and cover foil, which may for example be carried out by inserting customary sealing medium. Alternatively, the groove, as in the embodiment according to FIGS. 1 to 3, may merely extend over the central portion of the bending body 1 and, from the beginning, be closed at its ends.

As also shown in FIGS. 8 and 10 lateral recesses 83, 84, 85, 86 may be provided on the upper side opposite the groove opening in order to improve the behaviour with respect to bending of the bending body 71, cf. in particular FIGS. 7, 8 and 10.

Although, as ascertained above, it is favourable to have adjusting elements disposed, together with the transducer elements (strain gauges), in the areas hermetically sealed by the cover foil it can be favourable for other embodiments of the invention to have these adjusting elements disposed partially or completely outside the cover foil or for the cover foil to be applied first of all over the strain gauges alone and not to cover the adjusting elements until later after successful adjustment.

Having thus described the invention, what is claimed is:

1. An electromechanical bending force receiver for weighing cells and the like comprising a bending body capable of being loaded with a force to be measured, at least one electromechanical transducer in the form of a strain gauge disposed on said bending body and a covering foil protecting the strain gauge against environmental influences, wherein said bending body has a notch-like recess, said strain gauge is disposed in said recess, said recess is surrounded by a plane step surface located adjacent to that zone of the bending body which is neutral with respect to bending and said covering foil is arranged in said neutral zone of said bending body and is hermetically bonded to said step surface.

2. A bending force receiver as in claim 1 in which said bending body is essentially bar-shaped, said bending force receiver comprising a second essentially bar-shaped body formed with a notch-like recess, a strain gauge disposed in said second body recess, a covering foil adjacent to the zone of said second body which is neutral with respect to bending and means connecting said bar-shaped bodies in a parallelogram arrangement.

3. A bending force receiver as in claim 1 comprising means for securing one end of said body to a support and an arm on said body extending from the other end thereof toward said support for loading said body to produce positive and negative strain areas.

4. A bending force receiver as in claim 1 in which said covering foil is soldered to said step surface.

5. A bending force receiver as in claim 1 in which said covering foil is welded to said step surface.

6. A bending force receiver as in claim 1 including a plurality of strain gauges in said recess.

7. A bending force receiver according to claim 1, characterized in that the covering foil (15; 52, 53; 82) consists of the same material as the bending body (1, 41, 71).

8. A bending force receiver according to claim 7, characterized in that the bending body (1, 41, 71) and the covering foil (15; 52, 53; 82) consist of metal.

9. A bending force receiver according to claim 1, characterized in that the recess (4; 44, 45; 73) being hermetically sealed by the covering foil (15; 52, 53; 82) is filled with a protective gas.

* * * * *